Dec. 3, 1963     J. R. BURNS ETAL     3,112,970
METHOD AND MEANS FOR APPLYING LUBRICANT TO PROPELLER SLIP RINGS
Filed June 27, 1960     3 Sheets-Sheet 1
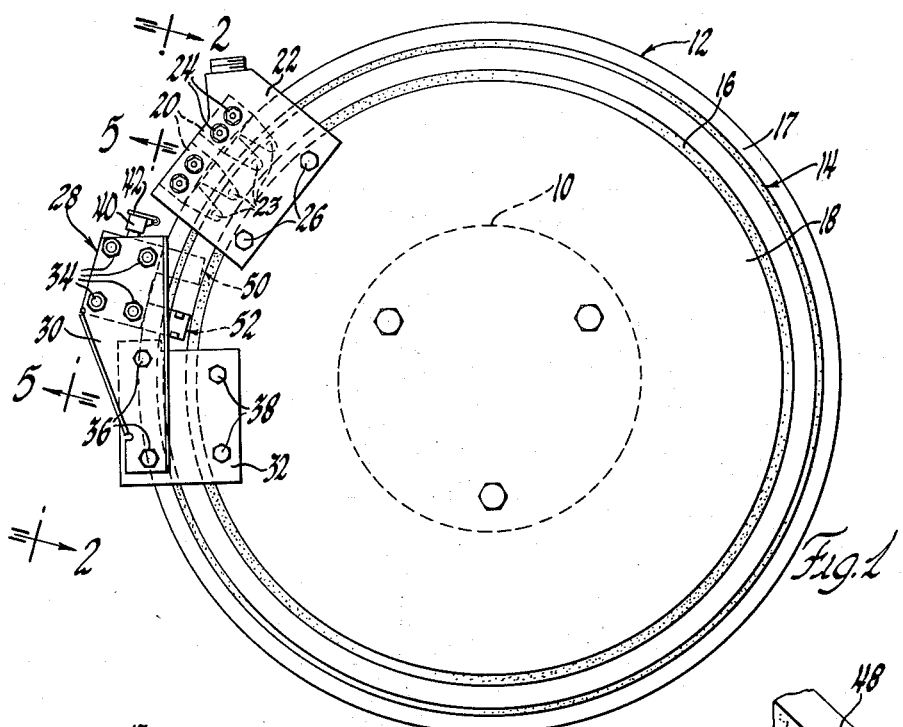
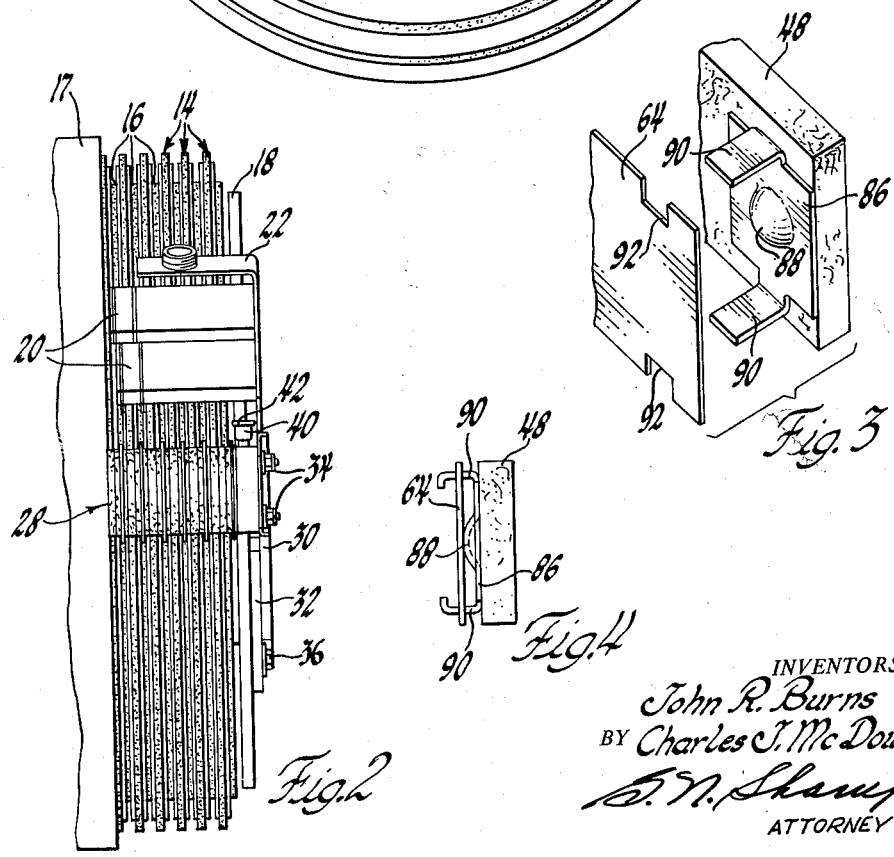
INVENTORS
John R. Burns &
BY Charles J. McDowall
*S. N. Shampo*
ATTORNEY Dec. 3, 1963   J. R. BURNS ETAL   3,112,970
METHOD AND MEANS FOR APPLYING LUBRICANT TO PROPELLER SLIP RINGS
Filed June 27, 1960   3 Sheets-Sheet 2

INVENTORS
John R. Burns &
BY Charles J. McDowall
S.N. Shampo
ATTORNEY

Dec. 3, 1963  J. R. BURNS ETAL  3,112,970
METHOD AND MEANS FOR APPLYING LUBRICANT TO PROPELLER SLIP RINGS
Filed June 27, 1960  3 Sheets-Sheet 3

INVENTORS
John R. Burns &
BY Charles J. McDowall

ATTORNEY

United States Patent Office 3,112,970
Patented Dec. 3, 1963

3,112,970
METHOD AND MEANS FOR APPLYING LUBRICANT TO PROPELLER SLIP RINGS
John R. Burns and Charles J. McDowall, Indianapolis, Ind., assignors to General Motors Corporation, Detroit, Mich., a corporation of Delaware
Filed June 27, 1960, Ser. No. 38,945
5 Claims. (Cl. 339—5)

This invention relates to an improvement in propeller assemblies and more specifically relates to a means for extending the life of silver and silver alloy slip rings and brushes in propeller assemblies such as are operated under high altitude, extremely dry or high purity atmospheric conditions.

The propellers of high speed propeller driven aircraft, particularly multi-engine aircraft, are complex mechanisms that frequently contain a number of electrical devices. Means must be provided to convey electrical current from a relatively stationary electrical power source which is removed from the propeller to the various electrical devices located within the rotating propeller. Suitable means for this purpose are shown and described in United States Patents Nos. 2,797,761 Barish et al., entitled "Propeller Mechanism" and 2,804,154 Treseder et al., entitled "Concurrent Blade Pitch Control of Coaxial Propellers," both of which are assigned to the assignee of the present invention.

Generally, such aircraft propellers are provided with a plurality of axially aligned spaced slip rings located within the propeller hub assembly. The slip rings are axially rotated as the propeller is rotated. The propeller hub assembly also contains a relatively stationary mounting means on which a plurality of relatively fixed electrical brushes are supported contiguous the slip rings. Electrical leads from a suitable source of electrical power extend through a non-rotating portion of the propeller to the relatively fixed brushes when they are appropriately connected. The brushes, of course, are in continuous contact with the rotating slip rings, which in turn are connected by suitable means to the various electrical devices in the rotating portion of the propeller.

It has been found that the silver and silver alloy brushes and slip rings generally function quite satisfactorily under normal sea level atmospheric conditions, but that at high altitudes these parts, particularly the brushes, wear at an objectionably high rate. The term "silver alloy" is intended to encompass those alloys containing more than 50%, by weight, silver. With the advent of jet-prop aircraft which are operated at comparatively high altitudes for long durations of time, the problem of poor wear resistance of moving electrical contacts is aggravated. The use of a jet-prop engine in commercial airline aircraft presents a particular problem, as commercial airlines generally desire that only perfunctory engine maintenance be required within every 1,000 hours of engine operation. As replacement of electrical brushes or slip rings is not considered to be merely perfunctory maintenance, the necessity of replacing these parts within each 1,000 hours of engine operation is particularly objectionable to commercial airlines.

The cause of the high rate of wear is not clearly understood. However, the effects thereof are readily apparent and are of considerable concern. The rate of wear is frequently so large that replacement of brushes and occasionally even slip rings is required between major engine overhauls. At best, the rate of wear is erratic, still requiring periodic examination of the brushes and slip rings between major engine overhauls. Such action, at least, requires disassembly of the propeller hub, involving increased maintenance costs, greater non-revenue periods for the aircraft, possible delays in scheduled flights, etc.

It is a principal object of this invention to provide a means for improving the poor wear resistance of moving electrical contacts. It is a further object of the invention to provide a method and apparatus for reducing the wear of silver and silver alloy moving electrical contacts in an aircraft propeller hub assembly.

These and other objects of the invention are attained by applying a wear-reducing liquid to the surface of the slip rings within the propeller hub assembly. A relatively stationary device containing a supply of the wear-reducing liquid is provided within an aircraft propeller hub assembly adjacent the slip rings therein. A plurality of spring-biased, liquid-retentive members project from the device to the contact surface of the slip rings. Rotation of the slip rings against the relatively stationary liquid-retentive members imparts a thin film of the wear-reducing liquid on the contact surface of the slip rings.

Further objects, features and advantages of the invention will appear more fully from the following description of specific embodiments thereof and from the drawings, in which:

FIGURE 1 shows a fragmentary front view in elevation of the accessory plate and slip ring area of an aircraft propeller hub assembly;

FIGURE 2 shows an elevational view along the line 2—2 in FIGURE 1;

FIGURE 3 shows an enlarged exploded fragmentary view in perspective of a specific construction of the applicator shown in FIGURES 5 and 6;

Figure 5:
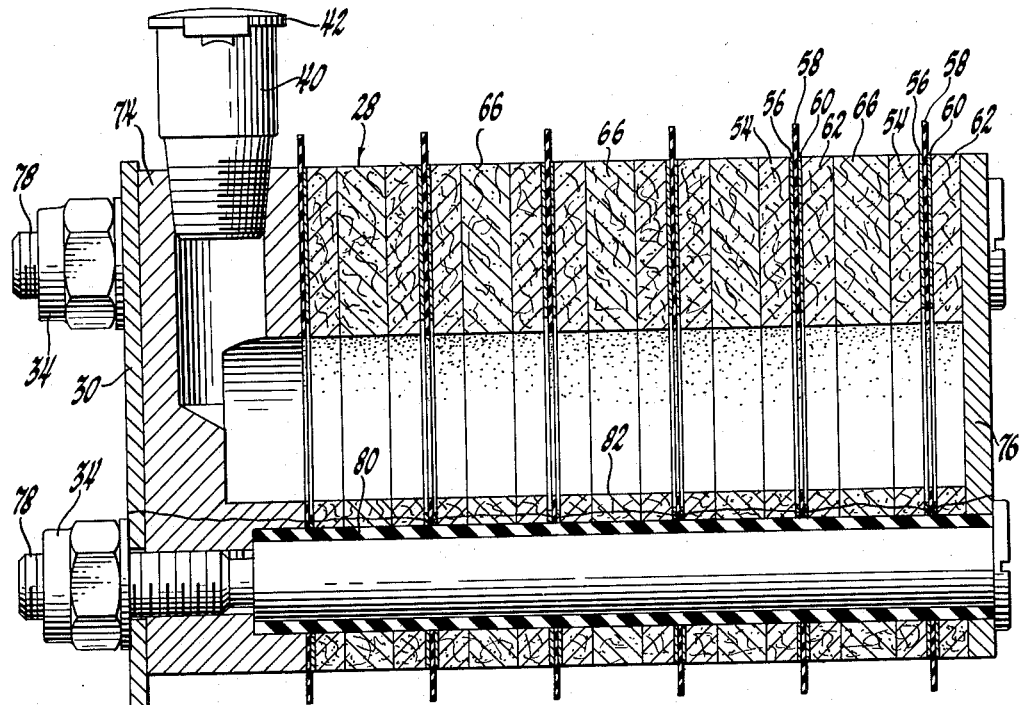
Figure 6:
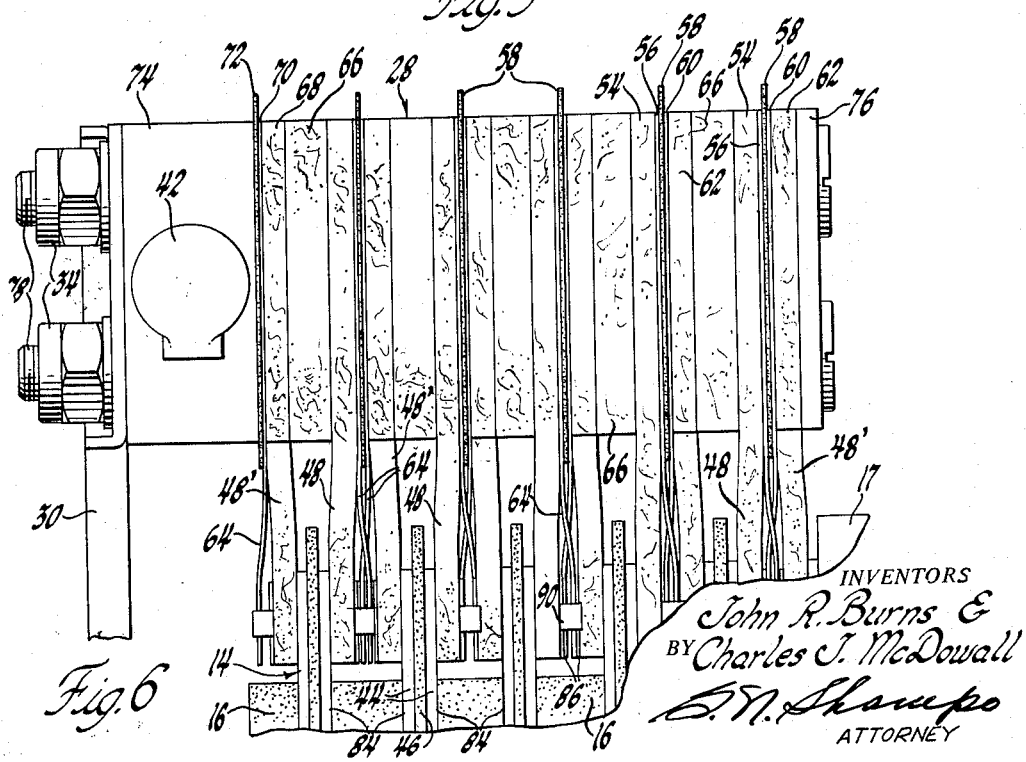
Figure 7:
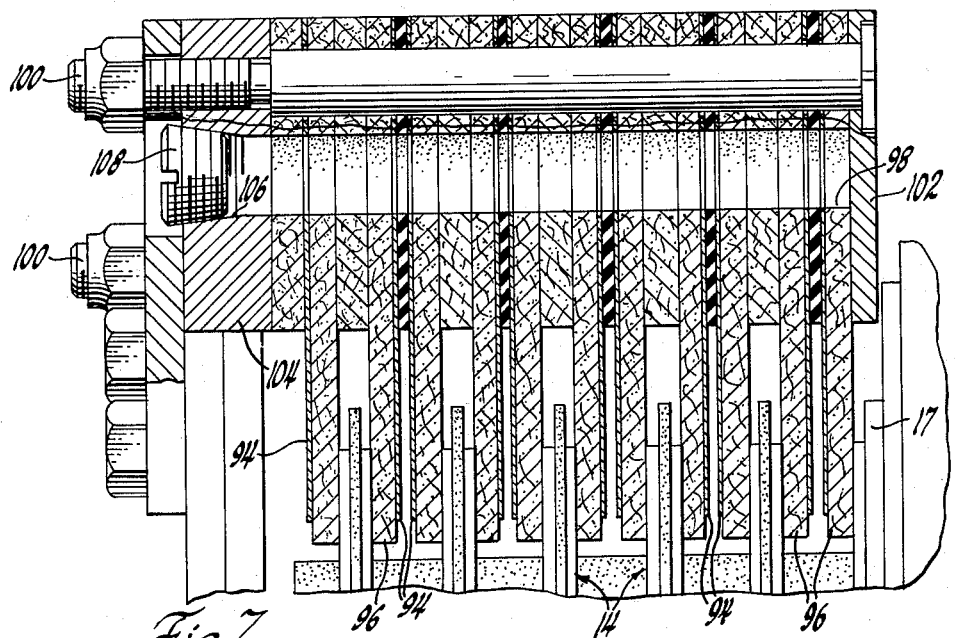
Figure 8:
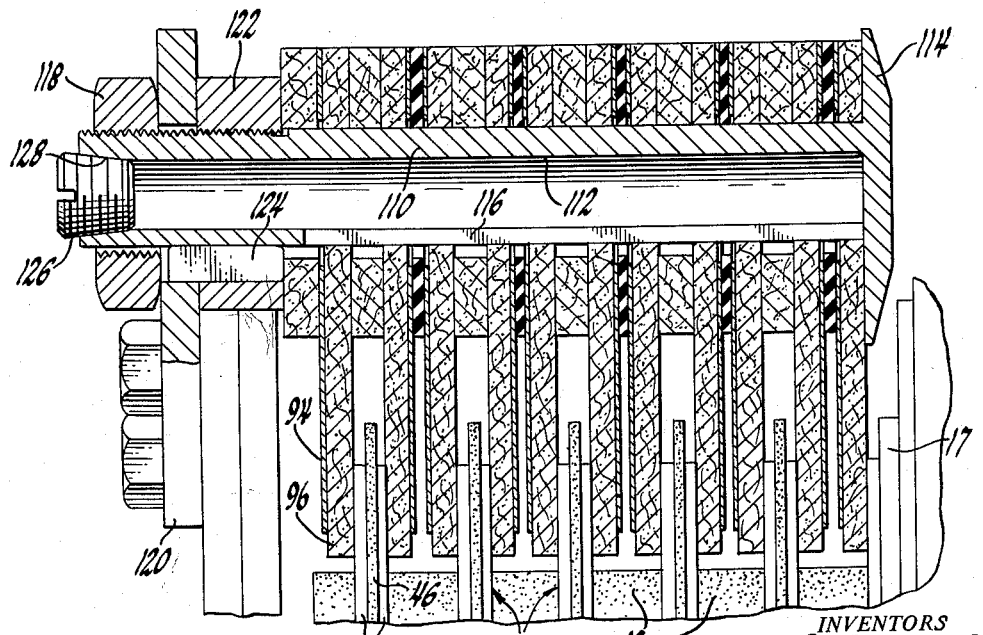

FIGURE 4 contains an elevational view of the assembled parts illustrated in FIGURE 3;

FIGURE 5 shows an enlarged longitudinal sectional view in partial elevation along the line 5—5 in FIGURE 1;

FIGURE 6 contains a top view of the apparatus shown in FIGURE 5;

FIGURE 7 shows a longitudinal view in partial elevation of a modification of the device shown in FIGURES 5 and 6; and FIGURE 8 shows a similar view of another modification of the device shown in FIGURES 5 and 6.

When a sulfur-containing lubricant such as that generally used in a jet-prop engine is applied to the contact surface of a silver or silver alloy slip ring, the rate of wear of the slip ring and electrical brushes in contact therewith is considerably reduced. Contrary to an immediate supposition that the improvement is attained solely because of boundary lubrication, it has been found that other lubricants do not provide the unexpected improvement achieved with the invention. Lubricants which contain bound sulfur (sulfur present as a compound rather than in its free state) can be used to attain an unexpected improvement in wear of silver and silver alloy moving contacts. However, especially satisfactory for this purpose is a bound sulfur-containing diester lubricant, such as that which fulfills the requirements set forth in "Military Specification for Lubricating Oil, Gas Turbine Aircraft," No. MIL-L-7808 (USAF). Such a lubricant is frequently referred to as a "diester type" or "MIL-L-7808 type" lubricant. Diester lubricants which may be used would include those such as one containing 1% phenolthiazine, 2% to 3% tricresylphosphate, and the balance di-2-ethyl hexyl sebacate.

A further description of the invention is more satisfactorily accomplished with reference to FIGURES 1 and 2. These figures contain views showing the slip ring assembly and accessory plate area of an aircraft propeller hub assembly, such as is described in the aforementioned United States Patents Nos. 2,797,761 and 2,804,154. The propeller hub assembly contains a central non-rotatable shaft 10 around which the moving portions 12 of the propeller rotate. A plurality of slip ring assembly elements 14 separated by non-conductive spacing members 16 are axially aligned and suitably secured to supporting rotating part 17 of the propeller hub.

An end plate 18 is rigidly secured by bolts to the outer end of the stationary central shaft 10 generally parallel to and spaced from the slip ring assembly elements 14. The end plate 18 functions as a mounting means for devices which are to be non-rotatably mounted for coaction with the rotating slip rings. Two brush block assemblies 20, each of which is formed of a plurality of aligned brushes 23, are secured at 24 to a mounting bracket 22. The mounting bracket 22 is, in turn, rigidly attached to the relatively stationary mounting plate 18 by means of bolts 26. Electrical leads (not shown) contained in a suitable conduit (also not shown) which is connected to the mounting bracket 22, are appropriately attached to the brush block assemblies 20.

A wear-reducing liquid dispenser 28 is attached to the mounting plate 18 by means of the supporting bracket 30 and the adaptor bracket 32. The dispenser is attached by nuts 34 to the supporting bracket 30. The supporting bracket is attached by bolts 36 to the adaptor bracket. The adaptor bracket is secured by bolts 38 to the mounting plate 18, thereby providing a relatively stationary rigid support for the dispenser. The nuts 34, securing the dispenser 28 to the supporting bracket 30, additionally serve to maintain the various separable parts of the dispenser in assembly. The dispenser 28 has a short tube 40 projecting from an upper part thereof to facilitate introducing the wear-reducing liquid into the interior of the dispenser. A cover 42 is provided over the upper end of the tube 40 to prevent entrance of foreign materials into the interior of the dispenser and restrict loss of liquid therefrom during operation.

The specific construction of the dispenser 28 and the manner in which it coacts with the contact surfaces of the slip ring assembly elements 14 are more fully described with additional reference to FIGURES 5 and 6. The slip ring assembly elements 14 are formed of two rings 44 of silver or a silver alloy separated by a larger diameter non-conductive reinforcing ring 46. The latter can be formed of any suitable material, such as Bakelite, polyester impregnated fiber glass or the like.

Adjacent aligned slip ring elements 14, as previously mentioned, are separated by the non-conductive spacing elements 16, which also can be made of Bakelite, polyester impregnated fiber glass or the like.

The dispenser contains a plurality of extensions 48 thereon which form two generally parallel rows 50 and 52 of such extensions, as indicated in FIGURE 1. Two laterally adjacent extensions 48 and 48' extend interjacent each neighboring pair of slip ring assembly elements 14.

For purposes of explanation the dispenser shown in FIGURES 5 and 6 can be considered as including a plurality of similar apertured dispenser units which, when stacked together, define a hollow article. The units are formed of a plurality of relatively flat members of a generally similar peripheral configuration having a central aperture therein. The unit members are stacked in the following order: A first liquid-retentive member 54, a first spring member 56, a rigid non-conductive insulating member 58, a second spring member 60, and a second liquid-retentive member 62. The spring members also have extensions 64 thereon corresponding to the extensions on contiguous liquid-retentive members. The liquid-retentive members can be of felt or the like and the spring members, of course, can be formed of any suitable spring steel. The insulating member interjacent the spring members is preferably formed of a non-conductive material, such as plastic. Each of the units is, in turn, stacked to form a complete dispenser. The units are separated from one another by means of suitable liquid-retentive spacers 66 which are preferably of a non-conductive compressible material, such as felt.

The liquid-retentive members used in the invention are preferably formed of a relatively porous material, such as felt. The preferred material not only has the capacity of retaining large amounts of a liquid therein but also functions as a wick means for transferring a liquid from the dispenser reservoir to the slip ring surface.

The number of applicator units in the dispenser is determined by the number of slip rings which are to be lubricated. In some instances, as shown in FIGURES 5 and 6, the number of slip ring surfaces which are to be treated by the dispenser of our invention are such that a whole number of applicator units are not required in the dispenser. A half unit is used at one end of the dispenser and involves only a lubricant-retentive member 68, a spring member 70 adjacent the lubricant-retentive member and a non-conductive insulating and sealing member 72 contiguous the spring member 70.

The stacked applicator units are retained in assembly by means of the end plates 74 and 76 which are clamped together with bolts 78 extending longitudinally through the dispenser. The bolts 78 securing the assembly are each preferably surrounded by a tube 80 of non-conductive material.

The aligned applicator units and interjacent spacers have apertures therein which are in register to form a recess 82 within the dispenser. The end plate 76 forms an imperforate wall on one end of the recess 82 and the metal member 74 forms a closure for the opposite end of the recess. A passage within the latter end closure communicates with the recess providing means for introducing a wear-reducing liquid into the recess. The recess 82 thus forms a reservoir for storing a wear-reducing liquid in the dispenser.

As shown more clearly in FIGURES 1 and 6, the liquid-retentive members of the dispenser have projections thereon which extend into the area between the slip rings. The first liquid-retentive member 54 in each of the units in the dispenser has an extension 48 thereon which is aligned to form a longitudinal row of extensions. The extensions 48 are uniformly directionally biased by the contiguous spring members 56. The second liquid-retentive member 62 of each of the units also has an extension 48' thereon laterally spaced from the first liquid-retentive member extension 48 to form a second row of extensions generally parallel to the first. The extensions in the second row are uniformly directionally biased opposite to the direction of bias of the first liquid-retentive member extension by the second spring member 60. Thus, opposing slip ring surfaces 84 of adjacent slip ring assembly elements 14 are concurrently treated by the dispenser.

Referring now to FIGURES 3 and 4, the spring extensions 64 have a particular construction to more satisfactorily distribute the spring tension throughout the slip ring contact area of the liquid-retentive member extensions 48 and 48'. A flat metal member 86, having a length generally equivalent to that length of the liquid-retentive member extension 48 which is in contact with the slip ring, is positioned interjacent the extension 48 and the spring extension 64. The flat member 86 is secured to the extension 48 by means of any suitable adhesive. It is spaced from the extension 64 by means of an embossed area 88. The flat member 86 has wing members 90 thereon which extend through notches 92 on the sides of the extension 64. The ends of the wing members are bent toward one another to loosely retain the flat member 86 in engagement with the extension 64. Thus, in the event the flat member 86 becomes detached from the liquid-retentive member extension 48, it will still remain in place.

A modification of the dispenser is illustrated in FIGURE 7. This dispenser can be supported on the mounting plate 18 in a manner analogous to that described for the mounting of the dispenser shown in FIGURES 5 and 6. As described in connection with the aforementioned embodiment the present modification of the dispenser is also formed of a plurality of applicator units such as hereinbefore described. These units differ, however, from the units previously described in that the spring extensions 94 are contiguous the liquid-retentive member extensions 96 throughout their length. The plurality of units each has an aperture therein which is in register with the adjacent apertures in the stacked units to form a recess 98 within the dispenser. The applicator units in this modification are also maintained in assembly by means of bolts 100 extending longitudinally through the assembly. An end plate 102 forms an imperforate end wall for the recess within the assembly and is secured in place by means of the assembly bolts 100. The opposite end of the assembly contains an end closure member 104 having a threaded aperture 106 therein. A suitable plug member 108 is threaded into the aperture providing a readily removable means for introducing a wear-reducing liquid into the dispenser and forming an end closure for the recess 98 to inhibit entrance of foreign matter therein and loss of liquid therefrom.

The dispenser shown in FIGURE 8 is another modification of the dispenser shown in FIGURES 5 and 6. In this modification of the invention a single bolt 110 is provided as the means for maintaining the applicator unit in assembly and concurrently forming a reservoir 112 for a wear-reducing liquid within the dispenser. A single hollow bolt 110 having a flange 114 on one end extends longitudinally through the center of the applicator. The flange on the end of the bolt serves as means for clamping the units together. A longitudinal slot 116 running the length of the bolt corresponding to the length of the applicator unit in the dispenser communicates the interior of the bolt with the various applicator members.

An internally threaded metal assembly retainer 122 spaces the assembly from a supporting bracket 120 and concurrently maintains the dispenser parts in assembly before the dispenser is mounted. The supporting bracket 120 is in abutment with the assembly retainer 122 and made non-rotatable with respect thereto by means of a key 124. A nut 118 threaded on the outer diameter of the hollow bolt 110 secures the dispenser to the supporting bracket 120.

A plug member 126 positioned in the opening 128 in the end of the hollow bolt is in threaded engagement therewith. Removal of the plug member permits introduction of a wear-reducing liquid into the interior or reservoir area of the dispenser.

Both of the specific embodiments of the invention shown in FIGURES 7 and 8 involve a dual row a spring-biased projections of liquid-retentive members. By this we mean the first liquid-retentive member in each applicator unit has a projection thereon which is laterally spaced from a similar projection on the second liquid-retentive member of the applicator unit. The two projections being oppositely spring biased when aligned in the dispenser with similar applicator units form two longitudinal laterally spaced generally parallel rows of spring-biased, liquid-retentive members to treat opposite surfaces of a plurality of axially aligned spaced annular slip rings.

The dispenser formed in accordance with our invention can be covered with a sealing coating before use. A suitable coating would cover the entire body portion of the dispenser and in this manner protect against undue loss of liquid therefrom. The coating or jacket can be made of any suitable material, such as of silicone rubber, applied in the liquid state and subsequently cured to a solid coating by heating.

In addition, if desired, the dispenser shown in FIGURES 5 and 6 can be made as a sub-assembly which is retained together for convenience of handling, etc. by threading the bolts 78 into the end member 74. Such a construction is analogous to that shown in the modification shown in FIGURE 8 where the assembly retainer 122 is threaded on the hollow bolt 110. Similarly, the embodiment shown in FIGURE 7 may be modified so that the bolts 100 are threaded into the end closure member 104.

Although this invention has been described in connection with certain specific examples thereof, no limitation is intended thereby except as defined in the appended claims.

We claim:
1. A lubricating device for concurrently applying a liquid to a plurality of radial surfaces of adjacent slip rings, said adjacent slip rings being separated by a nonconductive spacing member, said lubricating device comprising a first row of aligned liquid-retentive members, a second row of liquid-retentive members laterally adjacent and generally parallel the first, resilient means for biasing each member of said first row in the same longitudinal direction against the radial surfaces of said slip rings on one side of said nonconductive spacing member, and resilient means for longitudinally biasing each member of said second row in a direction opposite to the direction of said first row and against said radial surface of said slip rings on the opposite sides of said nonconductive spacing members.

2. An aircraft propeller hub assembly comprising a lubricating device consisting of a plurality of stacked units, each of which involves a first liquid-retentive member, a first resilient member contiguous said liquid-retentive member, a nonconductive member contiguous said resilient member, a second resilient member contiguous said nonconductive member and a second liquid-retentive member contiguous said second resilient member, corresponding extensions on said first members, corresponding extensions on said second members laterally disposed from said first member extensions, each first liquid-retentive member extension of said units being biased by said contiguous resilient member in the same longitudinal direction, each second liquid-retentive member extension uniformly biased by said contiguous resilient member in a direction opposite to the direction of bias of said first liquid-retentive member extension, means for spacing adjacent units, and means for maintaining said adjacent spaced aligned units in said lubricating device, said lubricating device having a recess therein communicating with each of said liquid-retentive members.

3. In an aircraft propeller hub assembly a relatively stationary mounting means, current collector means rotatable relative to said mounting means, said current collector means including a plurality of aligned spaced rotatable conductors, a radial surface on each of said conductors adapted for continuous contact with a relatively stationary conductor during rotation of said current collector means, a relatively nonrotatable, wear-resistant liquid dispenser secured to said mounting means for applying a wear-reducing liquid to said surface, said dispenser having a plurality of stacked units, each of which involves a first liquid-retentive member, a first resilient member contiguous said liquid-retentive member, a nonconductive member contiguous said resilient member, a second resilient member contiguous said nonconductive member and a second liquid-retentive member contiguous said second resilient member, corresponding extensions on said first members, corresponding extensions on said second members laterally disposed from said first member extensions, said first liquid-retentive member extension of each unit being biased in the same longitudinal direction by said contiguous resilient member, said second liquid-retentive member extension of each unit being biased by said contiguous resilient member in a direction opposite to the direction of bias of said first liquid-retentive member extension, means for spacing adjacent units, and means for maintaining said adjacent spaced aligned units in assembly, and a liquid retentive member extension in contact with the surface of each of said current collector conductors.

4. The method of improving the wear resistance of an aircraft propeller sliding electrical contacts from the group consisting of brushes and slip rings formed of a metal from the group consisting of silver and silver alloys, said method comprising applying a bound sulfur-containing diester lubricant to the surface of said slip rings while said slip rings are concurrently being rotated with said aircraft propeller relative to a lubricant applicator means and said electrical brushes.

5. An aircraft propeller hub assembly comprising a nonrotatable mounting means, a plurality of fixed electrical conductors secured to said mounting means, a plurality of axially aligned spaced annular conductors formed of a metal from the group consisting of silver and silver alloys on the periphery of a current collector means, said current collector means rotatable relative to said fixed conductors, at least one of said annular conductors having a radial surface thereof contiguous at least one of said fixed conductors, a lubricating device for concurrently applying a liquid to a radial surface of a plurality of said annular conductors, said lubricating device comprising a first row of aligned liquid-retentive members, a second row of liquid-retentive members laterally adjacent and generally parallel the first, resilient means for biasing each member of said first row in the same longitudinal direction against radial surfaces of said annular conductors facing in one direction, and resilient means for longitudially biasing each member of said second row, in a direction opposite to the direction in which said first row is biased, against radial surfaces of said annular conductors facing an opposite direction.

References Cited in the file of this patent
UNITED STATES PATENTS

| | | |
|---|---|---|
| 1,115,848 | MacGregor | Nov. 3, 1914 |
| 1,495,657 | Wagner | May 27, 1924 |
| 1,650,190 | Condit | Nov. 22, 1927 |
| 2,501,321 | Elsey | Mar. 21, 1950 |
| 2,634,342 | Baechler et al. | Apr. 7, 1953 |
| 2,640,848 | Harman | June 2, 1953 |
| 2,725,540 | Scott | Nov. 29, 1955 |
| 2,750,308 | Burchfield | June 12, 1956 |
| 2,820,054 | Matuszak | Jan. 14, 1958 |
| 2,979,685 | Filipczak | Apr. 11, 1961 |

FOREIGN PATENTS

| | | |
|---|---|---|
| 12,980 | Great Britain | of 1912 |